United States Patent [19]

Lighthart

[11] Patent Number: 4,937,815

[45] Date of Patent: Jun. 26, 1990

[54] INTERRUPT PRIORITIZATION SYSTEM AND METHOD FOR A DEMAND SHARED BUS

[75] Inventor: L. Eric Lighthart, San Diego, Calif.

[73] Assignee: Systech Corporation, San Diego, Calif.

[21] Appl. No.: 274,008

[22] Filed: Nov. 21, 1988

[51] Int. Cl.$^5$ ............................................... H04J 3/02
[52] U.S. Cl. .................................... 370/85.4; 370/95.2
[58] Field of Search ............... 370/85, 96, 86, 90, 370/85.4, 85.5, 85.6, 95.2; 340/825.5, 825.51, 825.12, 825.1, 825.08, 825.54; 364/138, 241.2

[56] References Cited

PUBLICATIONS

Motorola-MC68153 Bus Interrupter Module, Product Review, 1983.
Signetics-SCC2698 Octal Universal Asynchronous Receiver/Transmitter (Octal-UART), Preliminary Specification, Dec. 1986, pp. 2-266 to 2-284.
Digital-DC349-AA Octal Asynchronous Receiver Transmitter, Data Sheet, Preliminary, Oct. 1984, pp. 1 to 23.
Intel-8259A Programmable Interrupt COntroller (8259A/8259A-2/8259A-8), Sep. 1987, pp. 2-271 to 2-294.

*Primary Examiner*—Benedict V. Safourek
*Assistant Examiner*—Wellington Chin
*Attorney, Agent, or Firm*—Lyon & Lyon

[57] ABSTRACT

System and method for regulating the servicing of multiple peripheral devices by a central processing unit. The system and method is highly beneficial where some of the peripheral devices place equal priority demand on the central processing unit. A plurality of link interfaces are interconnected between the peripheral devices and the central processing unit. The link interfaces are interconnected by means of token transmission circuitry. The token transmission circuitry requlates the operation of the link interfaces and thereby the serving of the peripheral devices. The use of the token transmission circuitry substantially increases the efficiency and performance of the link interfaces.

8 Claims, 4 Drawing Sheets

INTERRUPT ACTIVATE ROUTINE

INTERRUPT PRIORITIZATION SYSTEM AND METHOD FOR A DEMAND SHARED BUS

BACKGROUND OF THE INVENTION

Generally, this invention relates to the data communication between peripheral devices and a computer. Specifically, this invention relates to a transmission control method and system for prioritizing and servicing the various interrupts generated by multiple peripheral devices where some of the peripheral devices place equal priority demand on the computer.

Effective and efficient usage of a computer requires that the peripheral devices connected thereto (e.g., keyboards, displays and sensors) receive prompt and orderly servicing. Proper servicing results in minimizing costs by maximizing system efficiency and capability.

Various means have been used to regulate the servicing of peripheral devices. One method is known as a polling approach. The computer sequentially tests (or polls) each peripheral device in a prioritized order to determine if servicing is required. This polling is continually repeated. When the computer identifies a peripheral device that requires servicing the computer engages the appropriate software to service that device.

A more sophisticated method for servicing peripheral devices involves the use of interrupt requests. An interrupt request is a signal read by the computer indicating that a peripheral device awaits servicing. The interrupt request is generated by a means known as a link interface. After the interrupt request is generated, the computer, at an appropriate position in its program, executes a routine to service the peripheral device that prompted the interrupt.

Many peripheral devices require different types of servicing. Commonly, a peripheral device requires servicing for three reasons. The first reason occurs when the link interface is prepared to receive data from the peripheral device. An interrupt request for this reason is generally given the highest priority. The second reason, with a lower priority, occurs when the link interface is prepared to transmit data to the peripheral device. The third reason, with the lowest priority, occurs when the link interface is prepared to sense control information regarding the peripheral device; for example the status of a modem.

Heretofore, link interfaces for systems having a plurality of peripheral devices having similar servicing requirements have comprised two elements. The first element is a means to convert the signal from serial-to-parallel or from parallel-to-serial and separate the signal into its various priority level components. If the first element can be interconnected with only one peripheral device it is known as a UART. DUARTS and OCTARTS serve the same function as UARTS, but can be interconnected with two and eight peripheral devices, respectively.

The second element is a programmable interrupt controller (PIC). If the system has three priority levels three PICs are commonly used. A PIC is used to prioritize interrupts prompted by the peripheral devices. Once prioritized the interrupt signal is generated and read by the computer. After the computer acknowledges the interrupt request, the correct peripheral device is serviced.

SUMMARY OF THE INVENTION

The invention disclosed herein is a system and method for regulating the servicing of multiple peripheral devices where some of the peripheral devices place equal priority demand on the computer. The disclosed system and method substantially simplifies the link interface circuitry. The invention disclosed herein eliminates the need for including the PIC as an element of the link interface. Servicing of the peripheral devices is therefore accomplished more efficiently at a reduced cost than available by using prior art devices.

Generally, the disclosed system and method involves connecting the peripheral devices by means of transmission channels to a plurality of link interfaces that preferably, but not necessarily, have multi-channel and multi-priority capability. These link interfaces are connected to a central processing unit by means of a system bus and interrupt request and interrupt acknowledge circuitry. Additionally, the link interfaces are interconnected by means of token transmission circuitry. A signal, referred to herein as a token, is continually passed from one link interface to the next thereby regulating the servicing of the peripheral devices. The passing of the token is controlled by the central processing unit and the microcode implemented into each of the link interfaces.

DESCRIPTION OF THE DRAWINGS

Figure 1:
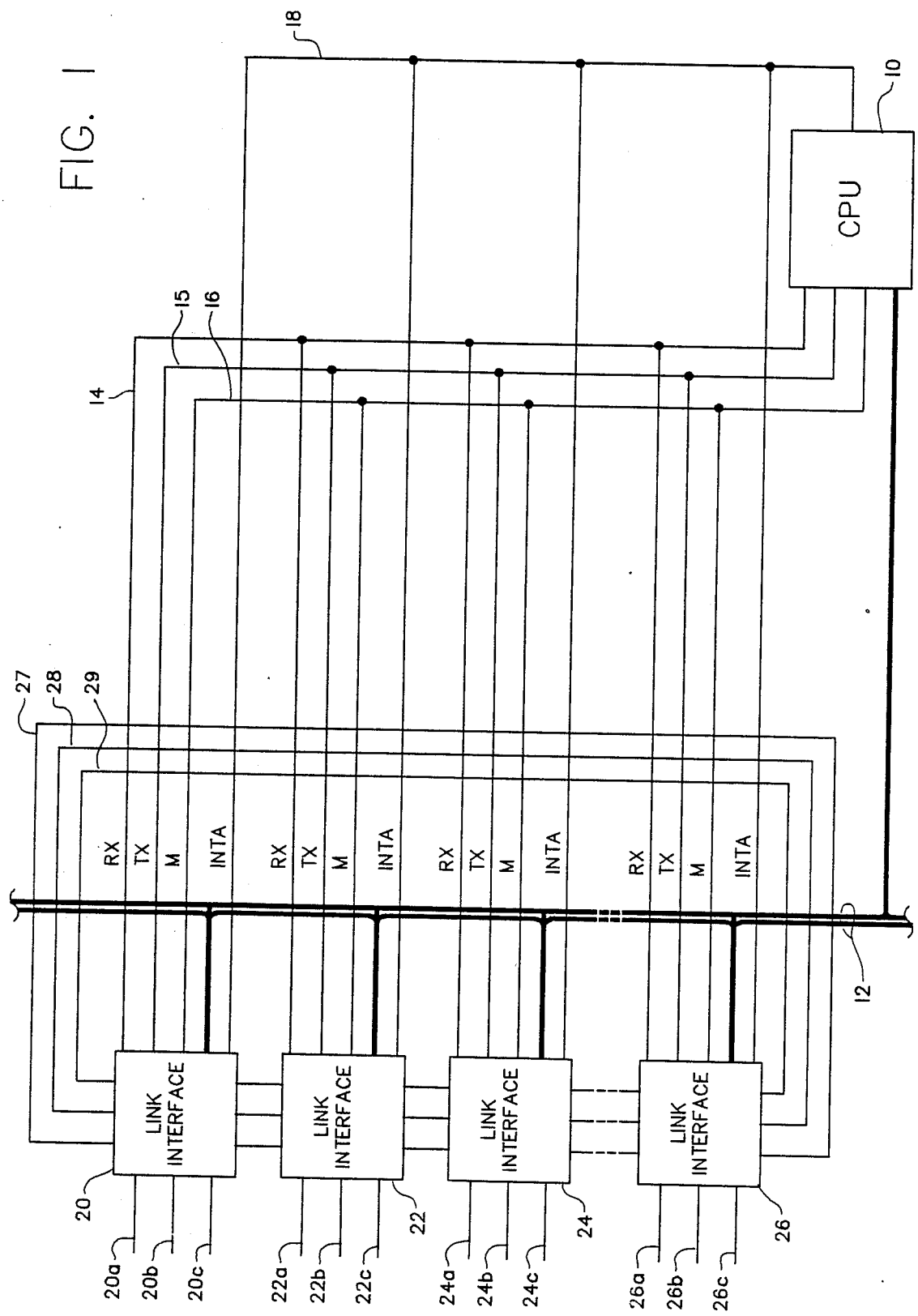
FIG. 1 is a block diagram of the transmission control system.

FIG. 1 illustrates a transmission control system. A central processing unit (CPU) 10 connects to a plurality of link interfaces 20, 22, 24 and 26 through a communication means 12 referred to herein as a system bus. The system bus comprises both a data feed and an address feed. Four link interfaces are depicted, but there could be more or fewer. Preferably, for increased efficiency, each link interface has multi-channel and multi-priority capabilities. However, the invention disclosed herein could be used even if the link interfaces have neither of these capabilities.

By example, and not by limitation, in the preferred embodiment, each link interface interconnects with a plurality of peripheral devices through transmission links having a first series of eight transmission channels for receiving data from the peripheral device (20a, 22a, 24a and 26a); a second series of eight transmission channels for transmitting data to the peripheral devices (20b, 22b, 24b and 26b); and a third series of eight transmission channels to sense control information (20c, 22c, 24c and 26c). Each of these three series of transmission channels has a different level of priority, as recognized by the CPU. Typically, the highest priority is equally given to all of the channels that receive data from the peripheral device, the next highest priority is equally given to all of the channels that transmit data to the peripheral device, and the lowest priority is equally given to all of the channels that sense control information.

Each link interface is also connected to the transmission control system CPU through means of interrupt request circuitry and interrupt acknowledge circuitry. The interrupt request circuitry is identified by the number 14 and the designation Rx for the input serial data; number 15 and the designation Tx for the output serial data; and number 16 and the designation M for the control information. The interrupt acknowledge circuitry is identified by the number 18 and the designation INTA.

Finally, the link interfaces are interconnected by means of token transmission circuitry. One token transmission circuit exists for each priority level. Thus, because the link interfaces in the preferred embodiment are regulating three levels of priority, three token transmission circuits (27, 28 and 29) are depicted.

Figure 2:
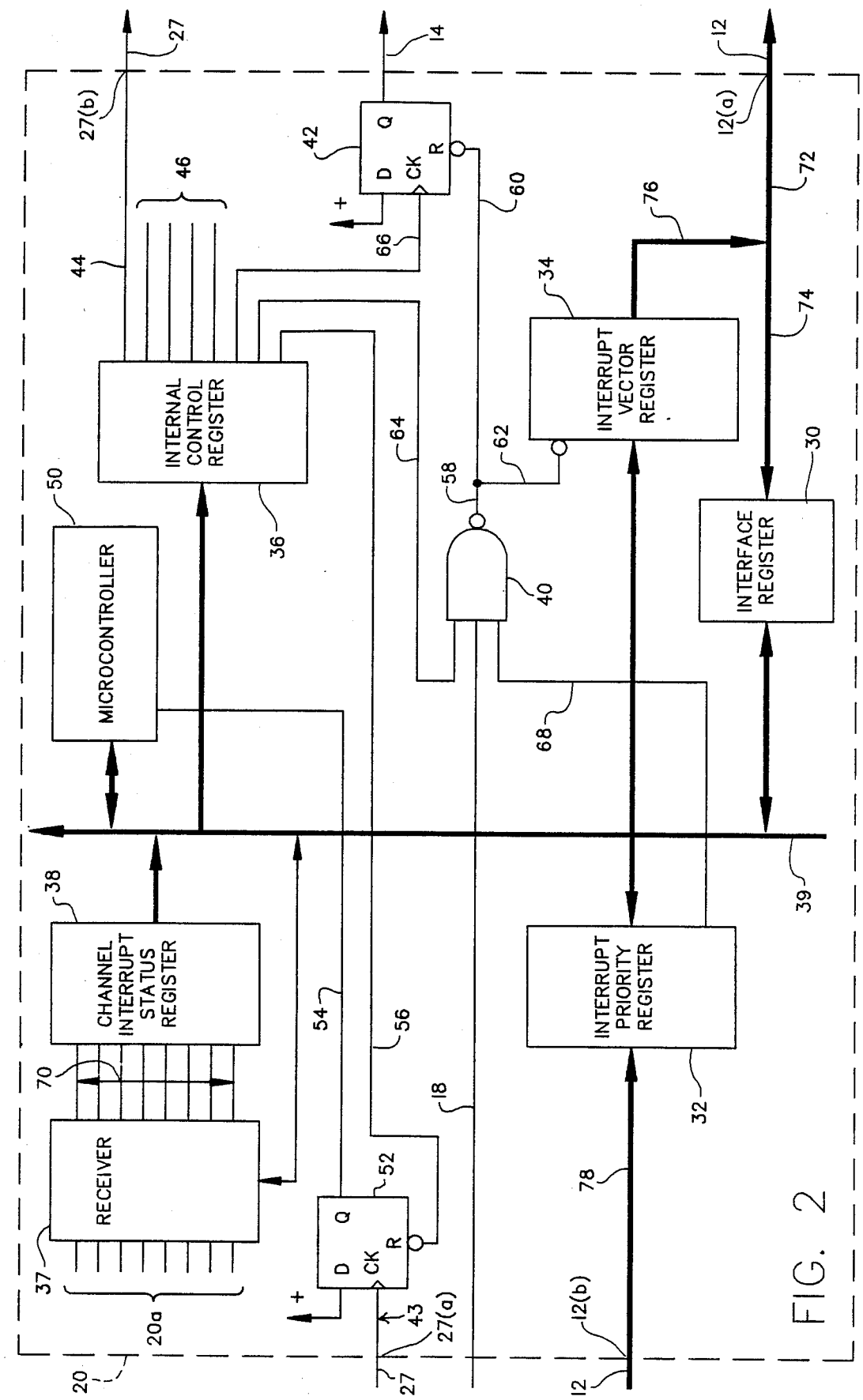
FIG. 2 is a block diagram of a link interface.

FIG. 2 illustrates the internal design of link interface 20. For purposes of simplicity, the drawing depicts and the specification hereafter discusses the design and operation of the link interface by assuming that the link interface is controlling the interrupt sequencing of one series of eight transmission channels having only one priority level. The design and operation of a link interface controlling the interrupt sequencing for peripheral devices having multiple levels of priority consists of the circuitry shown, duplicated for each of the two additional levels of priority.

The link interface connects to the system bus 12 at two points. The first connection, to the data feed, is at 12a and the second connection, to the address feed, is at 12b. Conductors 72 and 74 connect point 12a to a interface register 30. The interface register transfers data to and from the system bus to the internal address/data bus 39. Conductors 72 and 76 connect point 12a to an interrupt vector register 34. Conductor 78 connects point 12b to an interrupt priority register 32.

The interface register, the interrupt vector register and the interrupt priority register are irterconnected by the internal address/data bus 39. The internal address/data bus also connects to an internal control register 36, a receiver 37, a channel interrupt status register 38, and a microcontroller 50. One of series of eight transmission channels, in this instance the first series (20a), is connected with the link interface through receiver 37. The receiver makes the appropriate serial to parallel or parallel to series conversion. The receiver connects to the channel interrupt status register 38 by means of conductors 70. Microcontroller 50 can read the contents of interrupt status register 38 to determine if receiver 37 has data ready to transfer to the CPU.

Token transmission circuit 27 connects to the link interface at two points. The first connection is at 27a and the second connection is at 27b. The token transmission circuit signal inputs to the link interface at 27a and outputs at 27b. The input signal of the token transmission circuit to the link interface 20 is the output signal of the token transmission circuit from the previous link interface in the system. As depicted in FIG. 1, the previous link interface in the system is 26. The output signal of the token transmission circuit from link interface 20 is the input signal of the token transmission circuit to the next link interface in the system. As depicted in FIG. 1, the next link interface in the system is 22.

Conductor 43 connects point 27a with token transmission circuit input flip/flop 52. Flip/flop 52 is connected to microcontroller 50 by means of conductor 54 and to internal control register 36 by means of conductor 56. Similarly, conductor 44 connects point 27b with internal control register 36. Internal control register 36, via conductor 44, allows the token transmission circuit to be set at either LO or HI.

The internal control register also connects to NAND gate 40 by means of conductor 64 and to interrupt request flip/flop 42 by means of conductor 66, and to other internal devices, not depicted here, by means of conductors 46. Interrupt request flip/flop 42 allows the interrupt request circuit 14 signal to be set at either LO or HI. Besides connecting to the transmission control system CPU, flip/flop 42 also connects to interrupt vector register 34 by means of conductors 60 and 62 and to NAND gate 40 by means of conductors 60 and 58. NAND gate 40 also connects to the transmission control system CPU by means of interrupt acknowledge circuitry 18, and to the interrupt priority register 32 by means of conductor 68, and to interrupt vector register 34 by means of conductors 58 and 62.

Whenever the transmission control system commences operation the CPU first initializes the system. When initialization occurs the CPU 10 writes a first series of binary values into interrupt priority register 32 and a secondary series of binary values into interrupt vector register 34. The first series of binary values represents the interrupt priority code for each of the priority levels (three in the preferred embodiment) in link interface 20. The second series of binary values represents the interrupt vectoring location for each of the priority levels (three in the preferred embodiment) in link interface 20. When the CPU acknowledges an interrupt request by the link interface, one of the values from the first series of binary values will be placed on the address feed by the CPU. After the interrupt priority register has performed the appropriate comparison, the link interface responds by driving the appropriate interrupt vectoring location onto the data feed.

Additionally, when the link interface is initialized, the token transmission circuit output signal, the token transmission circuit input signal, and the interrupt request signal are set at LO. An internal control signal, known as the channel counter, is set to eight. The number for the channel counter equals the number of channels (eight in the preferred embodiment) that are connected to the link interface and have the same priority level. Each of these channels will be assigned a different channel number, between zero and seven, by the link interface.

All of the link interfaces in the transmission control system are similarly initialized. After initialization is accomplished, the CPU instructs one of the link interfaces to raise its token transmission circuit output signal to HI. This commences the operation of the interrupt sequencing that is hereinafter described.

Figure 3:
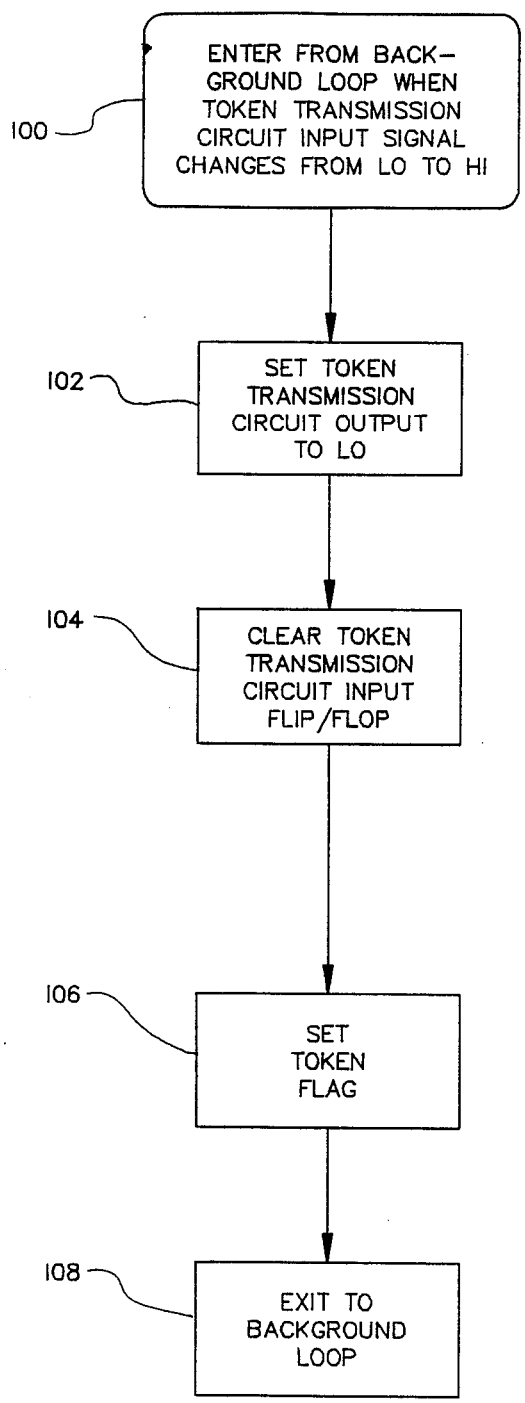
FIG. 3 is a flow chart depicting a portion of the microcode of the link interface including a subroutine referred to herein as the interrupt activate routine.
Figure 4:
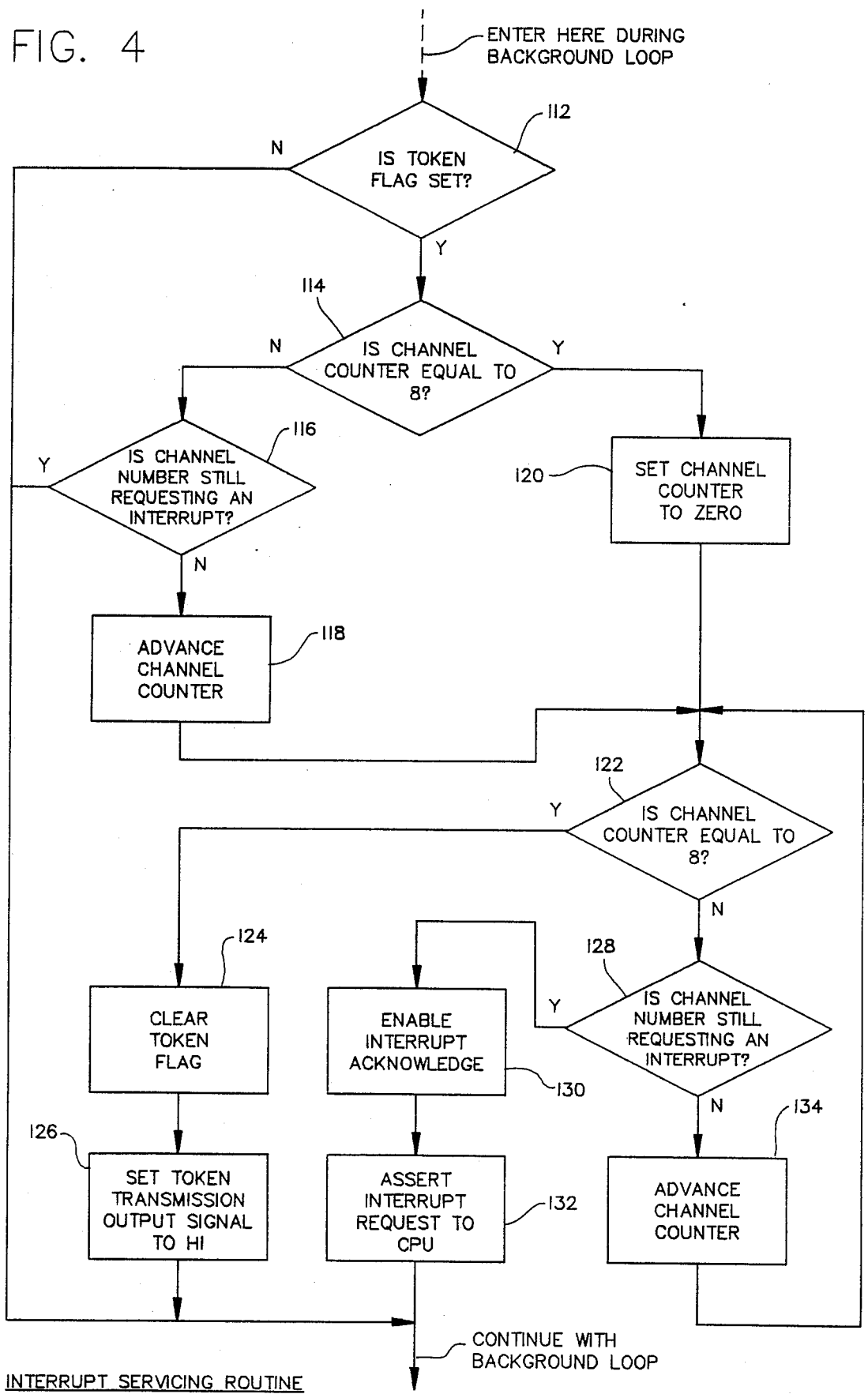
FIG. 4 is a flow chart depicting a portion of the microcode of the link interface including a sub-routine referred to herein as the interrupt servicing routine.

During operation the microcontroller 50 in link interface 20 repeatedly performs the same program. This program is referred herein as a background loop. The pertinent positions of that background loop and two sub-routines are depicted in FIG. 3 and FIG. 4. All of the other link interfaces in the transmission control system perform substantially the same background loop and sub-routines.

For purposes here, an assumption will be made that link interface 26 is initially requested by the transmission control system CPU to raise its token transmission circuit output signal to HI. When this occurs, token transmission circuit input flip/flop 52 in link interface 20 will activate and send a signal by means of conductor 54 to microcontroller 50. This signal will cause the microcontroller to execute the sub-routine depicted in FIG. 3 and referred to herein as the interrupt activate routine.

Referring to FIG. 3, block 100 represents the entry into the interrupt activate routine. At block 102, the token transmission circuit output signal is set to LO as required. This is generally necessary except when the transmission control system commences operation because the token transmission circuit output signal will already be set to LO by the initialization sequence. Block 104 is used to clear token transmission circuit input flip/flop 52. At block 106 an internal signal, referred to herein as a token flag, is set. For purposes herein, when the token flag is set, the link interface possesses the token for that priority level. The interrupt activate routine is exited at block 108.

At some point during the background loop, a check is made to determine if the token flag is set. This check is depicted in FIG. 4 at block 112. If the token flag is not set, the microcontroller continues its background loop. However, if the token flag is set, a sub-routine, referred to herein as interrupt servicing routine, is executed. At block 114, the value of the channel counter is determined. If the transmission control system was properly initialized the channel counter will equal eight. Therefore, the channel counter will be re-set to zero at block 120.

The value of the channel counter is again determined at block 122. At this point, because the channel counter equals zero, channel zero is checked, at block 128, to determine if an interrupt is being requested by that channel. If an interrupt is not being requested by channel zero, the channel counter is incremented at block 134. The steps shown in blocks 122, 128 and 134 are repeated until the channel counter reaches eight or the microcontroller identifies a channel that requires servicing. If a channel is identified that requires servicing, a signal is sent to NAND gate 40 by means of conductor 64 from internal control register 36 to enable the interrupt acknowledge circuitry of the link interface. This is shown by block 130. Additionally, as shown by block 132, a signal is sent from the internal control register to interrupt request flip/flop 42 by means of conductor 66. A signal is then sent to the transmission control system CPU by interrupt request circuit 14 indicating that the link interface requires servicing.

The microcontroller then resumes its execution of the background loop until the transmission control system CPU acknowledges and finishes servicing the channel interrupt. While the interrupt is awaiting servicing the microcontroller executes that portion of the interrupt servicing routine comprising blocks 14 and 116. At block 116 the microcontroller confirms that the interrupt request continues to await servicing.

Eventually the transmission control system CPU responds to the interrupt request and executes an interrupt acknowledge cycle. During an interrupt acknowledge cycle, the CPU places an interrupt priority code onto the address feed and also asserts the interrupt acknowledge signal. If the interrupt priority code matches one of the codes that was loaded previously into the interrupt priority register 32, then a signal is sent to NAND gate 40 from the interrupt priority register by means of conductor 68. Thereafter, a signal is sent from the NAND gate, by means of conductors 58 and 62, to interrupt vector register 34. The correct interrupt vectoring location and the appropriate data is then placed on the data feed.

After the servicing of the interrupt concludes, the microcontroller will advance the channel counter at block 118. Eventually, the channel counter equals eight. At this point, the token flag is cleared at block 124. At block 126, the internal control register sets the token transmission circuit output signal to HI. When this occurs the token transmission circuit input signal for the next link interface in the system (22) becomes HI. This will initiate the sub-routines depicted in FIG. 3 and FIG. 4 that comprise a portion of the program of the microcontroller in link interface 22. For purposes herein, when the token flag is cleared in one link interface and is set in the next link interface, the token is being passed.

Based on the foregoing specification, it should be clear that the token for a particular priority level can be possessed by only one link interface in the transmission control system at any given time. Furthermore, the token will always be possessed by one of the link interfaces in the system or is being passed from one link interface to the next link interface in the system. Thus, it can be said that one token is always in existence for each priority level.

The tokens, one for each priority level, will continually pass from one link interface to the next link interface in the system. The rate of passing will depend on interrupt activity and the rate that the CPU services the interrupt requests. The rate of passing need not be the same for each priority level. Thus, at any given time a particular link interface might possess none of the tokens, some of the tokens, or all of the tokens.

While exemplary versions of the invention have been described, it is to be understood that the invention is not limited to the details herein explained. It is expected that those skilled in the art will recognize numerous variations and equivalents which are within the spirit of the appended claims and which are entitled to be included therein. By way of example, the preferred embodiment uses a combination of hardware and microcode to implement the invention. However, the invention could be implemented entirely in hardware.

I claim:

1. A transmission control system for controlling the transmission of data between a central processing unit and a plurality of peripheral devices comprising:
   (a) a communication means for interconnecting the control system;
   (b) a central processing unit connected to the communication means;
   (c) a plurality of link interfaces connected to the communication means;
   (d) a plurality of transmission links interconnecting the link interfaces and the peripheral devices;
   (e) a plurality of interruption means connecting the plurality of link interfaces to the central processing unit for signalling an interruption to the central processing unit to initiate the need for the servicing of one of the plurality of peripheral devices;
   (f) token transmission circuitry serially connecting the plurality of link interfaces for controlling the interruption means for selectively sequencing the interruptions being signalled to the central processing unit; and
   (g) a means connecting the plurality of link interfaces to the central processing unit for acknowledging the interruptions signalled by the interruption means.

2. The transmission system of claim 1 wherein each of the link interfaces have multi-priority and multi-channel capabilities.

3. The transmission control system of claim 2 wherein each of the link interfaces connects to three series of transmission links wherein each of the series of transmission links has eight channels wherein each of the eight channels has an equal level of servicing priority.

4. A transmission control system for regulating the servicing of a plurality of peripheral devices, comprising:
 (a) a plurality of link interfaces each connected to one or more of the peripheral devices by means of one or more transmission channels wherein each link interface comprises a microcontroller, a plurality of registers, and circuitry for receiving, prioritizing and asserting the servicing needs of the peripheral devices connected to each link interface;
 (b) a token transmission circuit serially interconnecting two or more of the link interfaces for prioritizing, as between the link interfaces that are interconnected by the token transmission circuit, the servicing needs of the peripheral devices asserted by the link interfaces; and
 (c) a central processing unit interconnected with the plurality of link interfaces for acknowledging the servicing needs of the peripheral devices asserted by the link interfaces and for servicing the peripheral devices.

5. A method for selectively timing and sequencing multiple interruptions to a central processing unit, comprising the steps of:
 (a) receiving data by one or more of a plurality of link interfaces from one or more of a plurality of peripheral devices requiring servicing over one or more of a plurality of transmission channels;
 (b) evaluating the transmission channels individually and sequentially by means of token transmission circuitry serially interconnecting the plurality of link interfaces to identify one or the peripheral devices that requires servicing;
 (c) initiating an interrupt request signal by one of the link interfaces and read by the central processing unit after one of the peripheral devices that requires servicing is identified;
 (d) acknowledging the interrupt request signal by writing onto one of the link interfaces an interrupt acknowledge signal by the central processing unit; and
 (e) reading data by the central processing unit from the link interface interconnected with the peripheral device that is identified as requiring servicing.

6. A method for servicing a plurality of peripheral devices interconnected by means of a plurality of transmission channels to a plurality of link interfaces that are activated and deactivated wherein the link interfaces are interconnected to a central processing unit, comprising the steps of:
 (a) activating one of the plurality of link interfaces;
 (b) evaluating one or more of the transmission channels connected to the activated link interface to determine if one of the peripheral devices requires servicing;
 (c) generating an interrupt request signal by the activated link interface and read by the central processing unit if one or more of the peripheral devices interconnected with the activated link interface requires servicing;
 (d) acknowledging the interrupt request signal generated by the activated link interface by the central processing unit;
 (e) deactivating the activated link interface;
 (F) activating one of the plurality of link interfaces that was not immediately previously deactivated;
 (g) generating an interrupt request signal by the activated link interface and read by the central processing unit if one or more of the peripheral devices interconnected with the activated link interface requires servicing; and
 (h) acknowledging an interrupt request signal generated by the activated link interface by the central processing unit.

7. The method of claim 13 wherein steps (b), (c) and (d) are repeated one or more times before step (e) occurs.

8. A system for regulating the servicing of a plurality of peripheral devices comprising:
 (a) a plurality of link interfaces interconnected with the plurality of peripheral devices;
 (b) a central processing unit interconnected with the plurality of link interfaces;
 (c) a plurality of interruption means interconnecting each of the plurality of link interfaces with the central processing unit for signalling an interruption from each of the plurality of link interfaces to the central processing unit to initiate the need for the servicing of one of the plurality of peripheral devices;
 (d) a plurality of acknowledging means interconnecting each of the plurality of link interfaces with the central processing unit for acknowledging an interruption signalled by the interruption means; and
 (e) a communication means for interconnecting the plurality of link interfaces to sequentially activate and deactivate the plurality of link interfaces to regulate the interruptions being signalled to the central processing unit by the interruption means.

* * * * *